(12) United States Patent
Holson

(10) Patent No.: US 7,156,232 B1
(45) Date of Patent: Jan. 2, 2007

(54) HANGING FILE SYSTEM FOR CDS AND DVDS

(76) Inventor: Sheldon Holson, 13 Weatherbell Dr., Norwalk, CT (US) 06851

( * ) Notice: Subject to any disclaimer, the term of this patent is extended or adjusted under 35 U.S.C. 154(b) by 81 days.

(21) Appl. No.: 10/795,785

(22) Filed: Mar. 8, 2004

(51) Int. Cl.
*B65D 85/00* (2006.01)

(52) U.S. Cl. .................. 206/425; 206/311; 206/312

(58) Field of Classification Search ............. 206/425, 206/308.1, 310, 312, 311
See application file for complete search history.

(56) References Cited

U.S. PATENT DOCUMENTS

| | | | |
|---|---|---|---|
| 3,724,920 A * | 4/1973 | Beck ..................... | 312/184 |
| 4,234,238 A | 11/1980 | Figueroa | |
| 4,489,836 A | 12/1984 | Terrell | |
| 4,726,635 A * | 2/1988 | Rariden et al. .......... | 312/184 |
| 4,850,731 A * | 7/1989 | Youngs .................. | 206/308.1 |
| 4,860,897 A | 8/1989 | Fowler | |
| 5,048,697 A | 9/1991 | Payne | |
| 5,275,438 A * | 1/1994 | Struhl .................. | 281/31 |
| 5,288,144 A * | 2/1994 | Guderyon ............... | 312/183 |
| 5,299,688 A * | 4/1994 | McKay et al. ........... | 206/425 |
| 5,494,161 A * | 2/1996 | Herbst .................. | 206/425 |
| 5,545,087 A | 8/1996 | Seward | |
| 5,715,937 A | 2/1998 | Oshry | |
| 5,947,301 A | 9/1999 | Kunz | |
| D419,358 S | 1/2000 | Marcon | |
| 6,213,312 B1 | 4/2001 | Thielsen | |
| 6,352,157 B1 * | 3/2002 | Srinivasan .............. | 206/425 |
| 6,557,701 B1 | 5/2003 | Chen | |
| 6,644,482 B1 | 11/2003 | Ku | |
| 6,659,336 B1 | 12/2003 | Brennan | |
| 6,830,156 B1 * | 12/2004 | MacKelvie .............. | 211/40 |
| 2003/0062283 A1 * | 4/2003 | Tanji .................. | 206/425 |
| 2004/0035736 A1 * | 2/2004 | Peleman ................ | 206/425 |

FOREIGN PATENT DOCUMENTS

WO  WO97/10960  3/1997

\* cited by examiner

*Primary Examiner*—David T. Fidei
(74) *Attorney, Agent, or Firm*—James Marc Leas

(57) ABSTRACT

A hanging file system for compact disks and other small planar objects is provided. The system includes hanging file folders that are shrunken compared to standard letter sized or legal sized hanging file folders. The hanging file folder has open sides and two permanently fixed hangers. The hangers are separated by a fixed length which is less than 11 inches. An envelope can be used in conjunction with the hanging file folders to protect each compact disk stored in the hanging file folder. Thus, several CDs in their envelopes can be accommodated in each hanging file folder without risk of scratching. An identifying tab and label can be provided for each folder. A printed insert piece can be included in each folder along with compact disks. An adapter can be used to turn a standard letter or legal filing drawer into a drawer for holding at least two rows of hanging files for CDs. Alternatively, a portable container is provided sized for carrying the shrunken hanging file folders and their CDs.

35 Claims, 15 Drawing Sheets

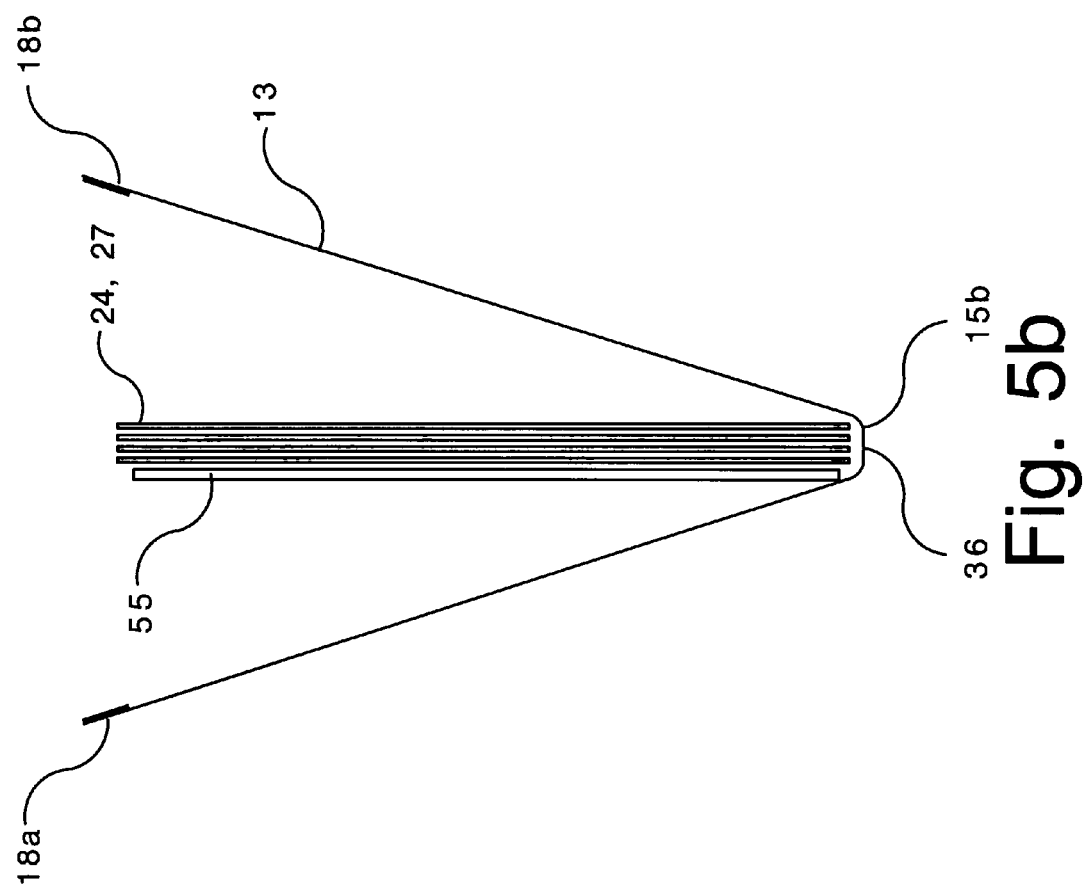

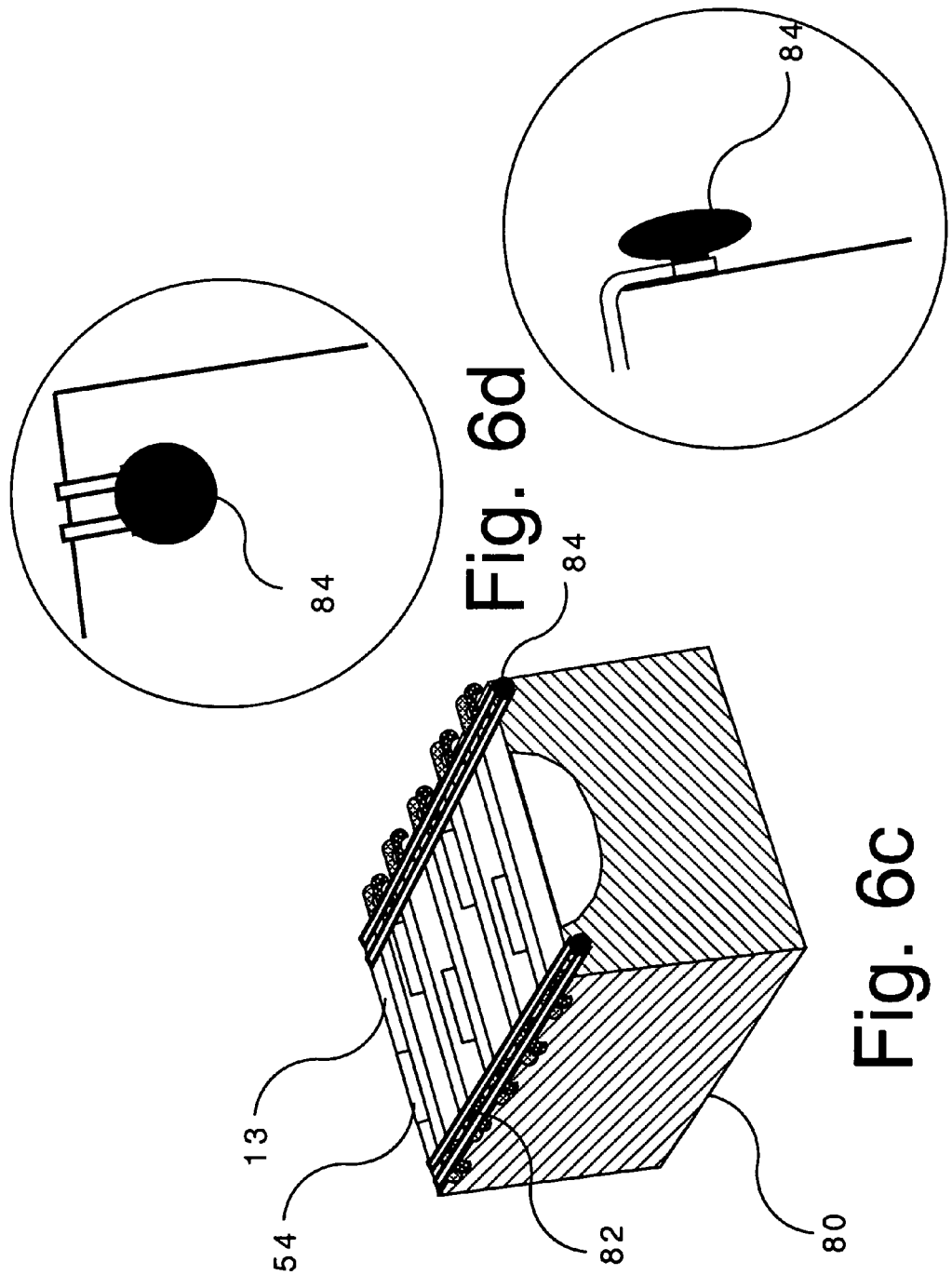

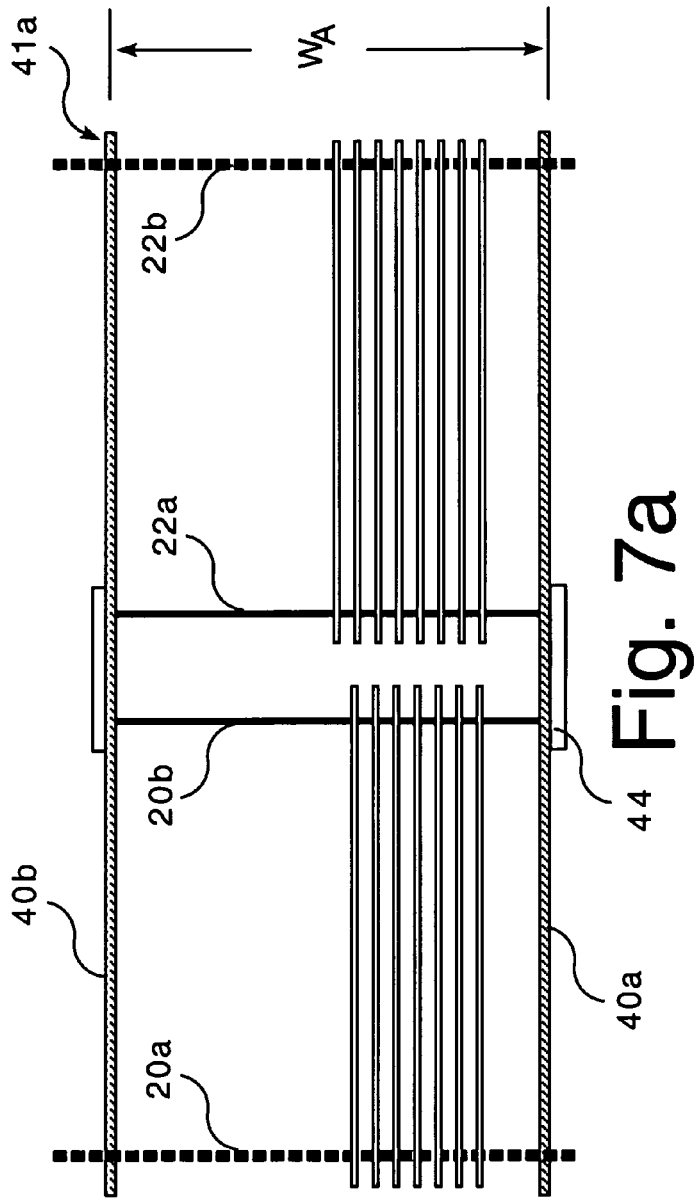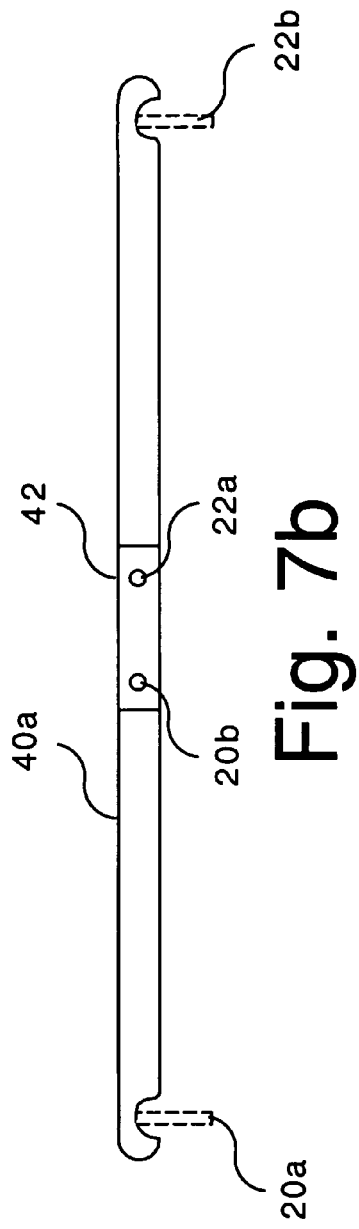

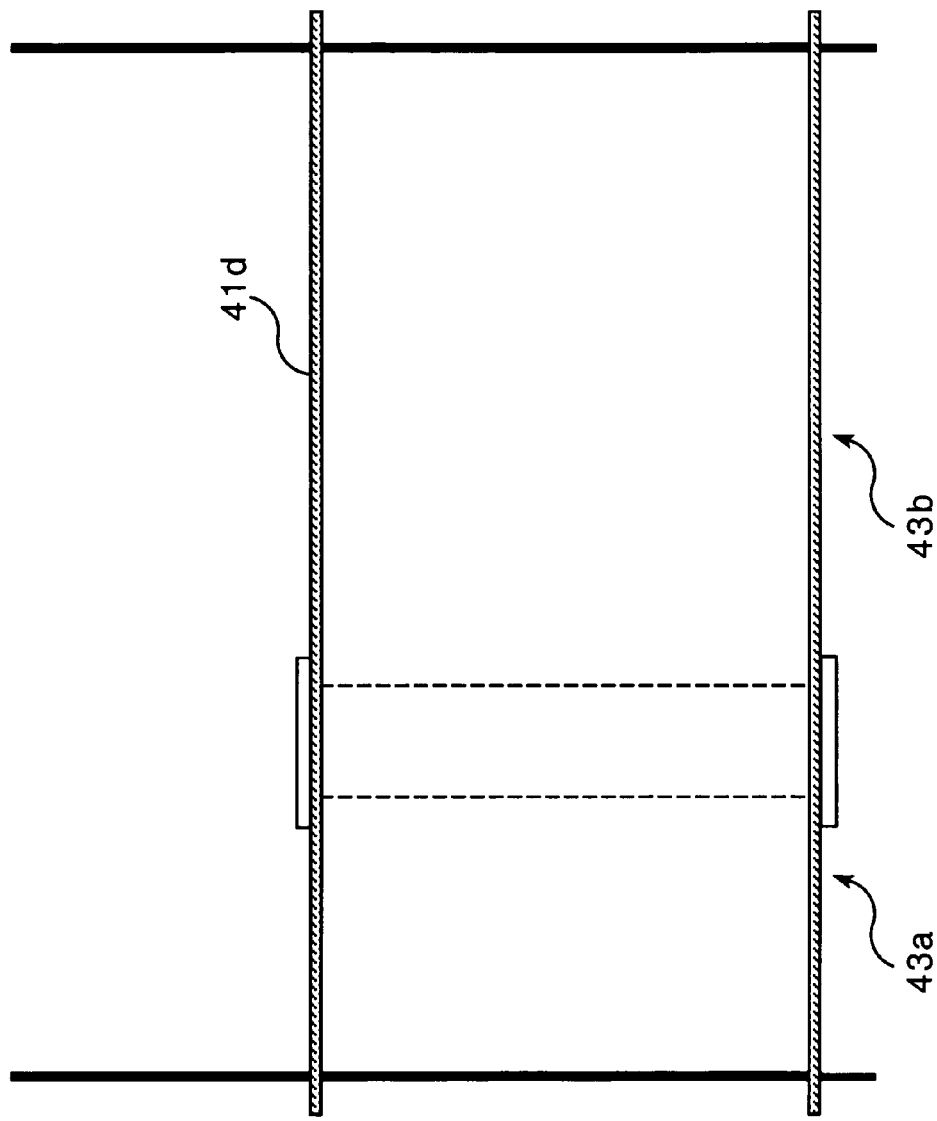

HANGING FILE SYSTEM FOR CDS AND DVDS

FIELD OF THE INVENTION

This invention generally relates to an improved storage system for small planar objects, such as compact disks, digital video disks, and floppy disks. More particularly, it relates to an improved hanging file system for such small planar objects.

BACKGROUND OF THE INVENTION

Hanging file systems, long used for storing paper files, have also been suggested for filing such small planar objects as floppy disks and compact disks (CDs), as shown in U.S. Pat. No. 4,860,897 to Fowler, U.S. Pat. No. 5,545,087 to Seward, U.S. Pat. No. 5,947,301 to Kunz, U.S. Design Pat. No. 419,358 to Marcon, and U.S. Pat. No. 6,557,701 to Chen. However, all of these systems have required expensive specialized hanging file storage sleeves or boxes.

The present inventor found that no system is presently available that provides a low cost hanging file system for storing CDs and other small planar objects. Thus, a better system for providing storage for CDs and other small planar objects is needed, and this solution is provided by the following invention.

SUMMARY OF THE INVENTION

It is therefore an object of the present invention to provide a low cost hanging file system for CDs, DVDs, and other such small planar objects;

It is a further object of the present invention to provide a hanging file system having hanging file folders sized to the dimensions of the small planar object being filed;

It is a further object of the present invention to provide a hanging file system having hanging file folders sized to the dimensions of the small planar object being filed and a box for holding these hanging file folders that is sized to the dimensions of these hanging file folders;

It is a further object of the present invention to provide a hanging file system having a hanging folder in which multiple planar objects may be filed in each hanging file folder without one rubbing or scratching another;

It is a further object of the present invention to provide multiple rows of hanging files for such small planar objects that can fit in a standard letter or legal sized filing drawer;

It is a feature of the present invention to provide a hanging file system that also includes a protective envelope for holding each small planar object in a hanging file folder;

It is a feature of the present invention that a hanging file folder has a length between hangers that is less than 11 inches;

It is a feature of the present invention that the length between hangers is in the range of about 1½ inches to about 7 inches;

It is an advantage of the present invention that several CDs, each in its own protective envelope, can be stored in each hanging file folder;

It is an advantage of the present invention that a printed insert with identifying information about a CD can be stored along with a CD in a hanging file folder;

These and other objects, features, and advantages of the invention are accomplished by a filing system comprising a hanging file folder. The hanging file folder has open sides and two permanently fixed hangers. The hangers for each folder each have midpoints. The midpoints are are separated by a fixed hanger separation length which is less than 11 inches.

Another aspect of the invention is a filing system comprising a hanging file folder. The hanging file folder has open sides and two permanently fixed hangers. The folder has a vertical dimension that is less than 8 inches.

Another aspect of the invention is a filing system comprising a hanging file folder. The hanging file folder has open sides and two permanently fixed hangers. The folder is approximately square.

Another aspect of the invention is a system for holding an array of small planar objects having a first dimension and a second dimension perpendicular to said first dimension. The system includes a box and hanging file folders. The box includes a pair of rails for supporting the hanging file folders. The hanging file folders have open sides and include hangers that are permanently fixed to the hanging file folders. The hangers have a fixed spacing between them that is no more than 2 inches larger than the first dimension. The hanging file folders have a vertical dimension that is no more than 2 inches larger than the second dimension. Each hanging file folder is for holding one or more of the small planar objects.

Another aspect of the invention is an adapter for a file drawer. The adapter includes at least two rails to provide a total of at least four parallel rails in the drawer. A first pair of rails is for supporting a first row of hanging file folders. A second pair of rails is for supporting a second row of hanging file folders. Spacing between rails of the first pair of rails is less than 8 inches.

Another aspect of the invention is a method of filing small planar objects. The method includes the step of providing a box or filing drawer. The method also includes the step of loading each small planar object in an envelope, wherein the envelope is for holding only one of the small planar objects. The method also includes the step of loading the envelope with the small planar object in a hanging file folder, wherein the hanging file folder has hangers having a hanger spacing that is less than 11 inches. The method also includes the step of loading the hanging file folder with the envelope and the small planar object in the box or in the file drawer.

BRIEF DESCRIPTION OF THE DRAWINGS

The foregoing and other objects, features, and advantages of the invention will be apparent from the following detailed description of the invention, as illustrated in the accompanying drawings, in which:

FIG. 5b is a side view of the hanging file folder of FIG. 5a, showing the printed insert piece and four envelopes each containing a CD;

FIG. 6c is a three dimensional view of another embodiment of the portable container of the present invention;

FIGS. 6d–6e are enlarged views of a portion of the portable container of FIG. 6c showing how a button is provided for connecting an elastic strap across each side of the container for securely storing a row of hanging file folders of the present invention;

FIG. 7a is a top view of an adapter for converting part of a standard letter sized file drawer into one for accommodating two rows of hanging file folders of the present invention;

FIG. 7b is a front view of the adapter of FIG. 7a;

FIG. 7d is a top view of an adapter for converting part of a standard letter or legal sized file drawer into one for accommodating two unequal rows of hanging file folders of the present invention.

DETAILED DESCRIPTION OF THE INVENTION

The present inventor recognized that hanging file systems provide advantage for storing and cataloguing small planar objects, such as optical memory storage disks, including CDs and DVDs, magnetic memory storage disks, including floppy disks, and paper or plastic products including photographs, checks, receipts, credit cards, photographs, greeting cards, personal notes, deposit slips, memos, recipes, ticket stubs, and cards, such as baseball cards, time cards, and golf score cards. He recognized that hanging file systems permit storing CDs or other small planar objects alphabetically, chronologically, or in any other desired organization. He also recognized that they have advantage in that they permit additional CDs to be added at any desired location in the file without having to move other files to maintain the organization. They also permit CDs to be removed from any location without having to move other files to maintain the organization. He also recognized that they also allow several CDs to be stored in each hanging file folder, each in its own protective envelope. They also allow printed documentation to be stored in each hanging file folder along with a CD. They also permit convenient labeling and provice an easy way to locate a particular CD.

The present inventor recognized that by shrinking dimensions for standard hanging file folders he could provide an improved system for storing and cataloguing CDs and other small planar objects at very low cost while provided a compact storage system whose dimensions fairly conform to the size of the small planar object.

The present inventor also recognized that two or more rows of such shrunken hanging file folders could be provided in a standard letter or legal sized filing drawer. He provided an adapter for a standard letter and legal sized filing drawer so that two or more rows of hanging file folders could be arranged in either of these drawers. He also provided a portable container sized to match the shrunken hanging file folders.

Figure 1A:
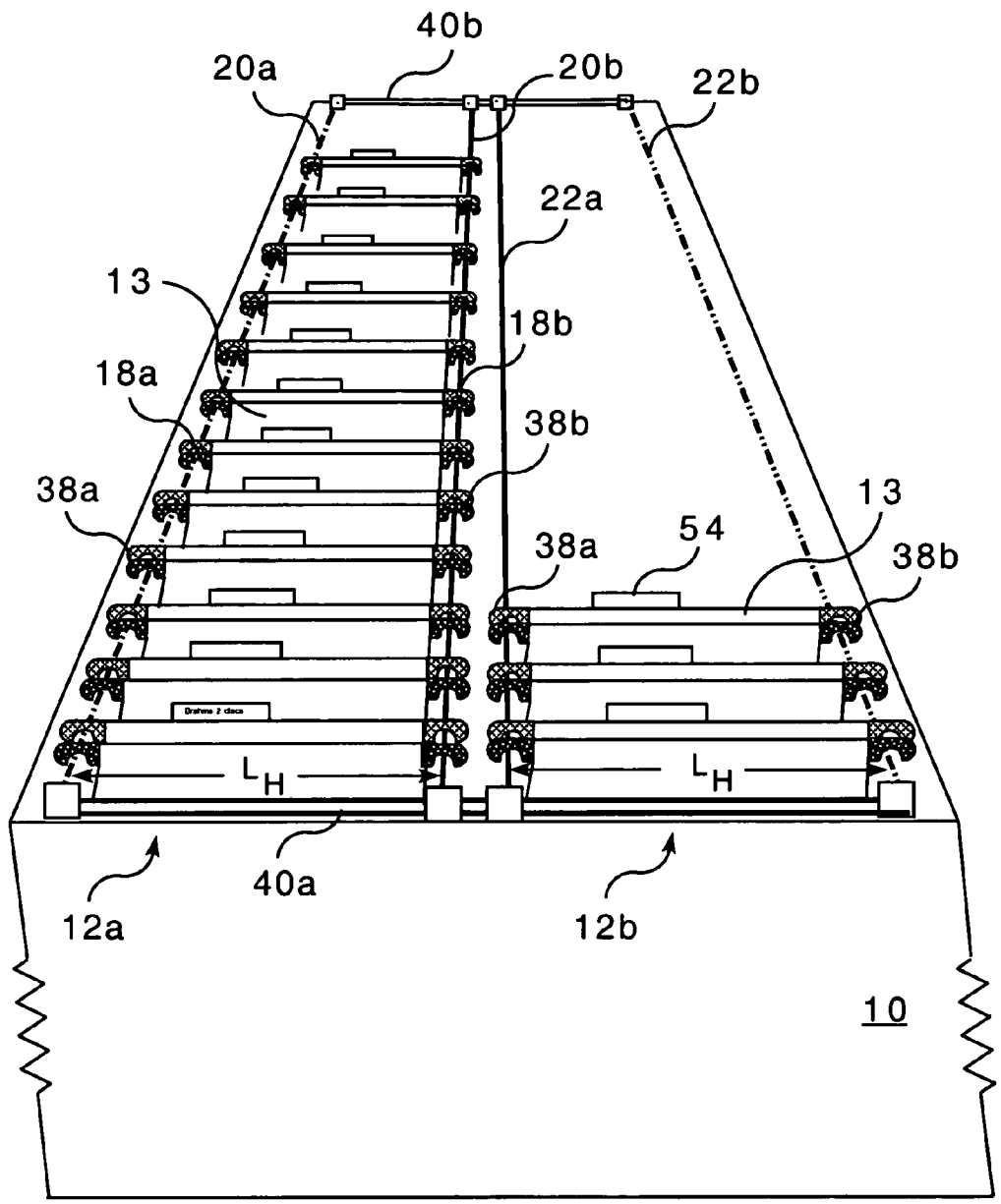
FIG. 1a is a three dimensional view of a standard letter sized file drawer with an adapter of the present invention that is supporting two rows of hanging file folders of the present invention.
Figure 1B:
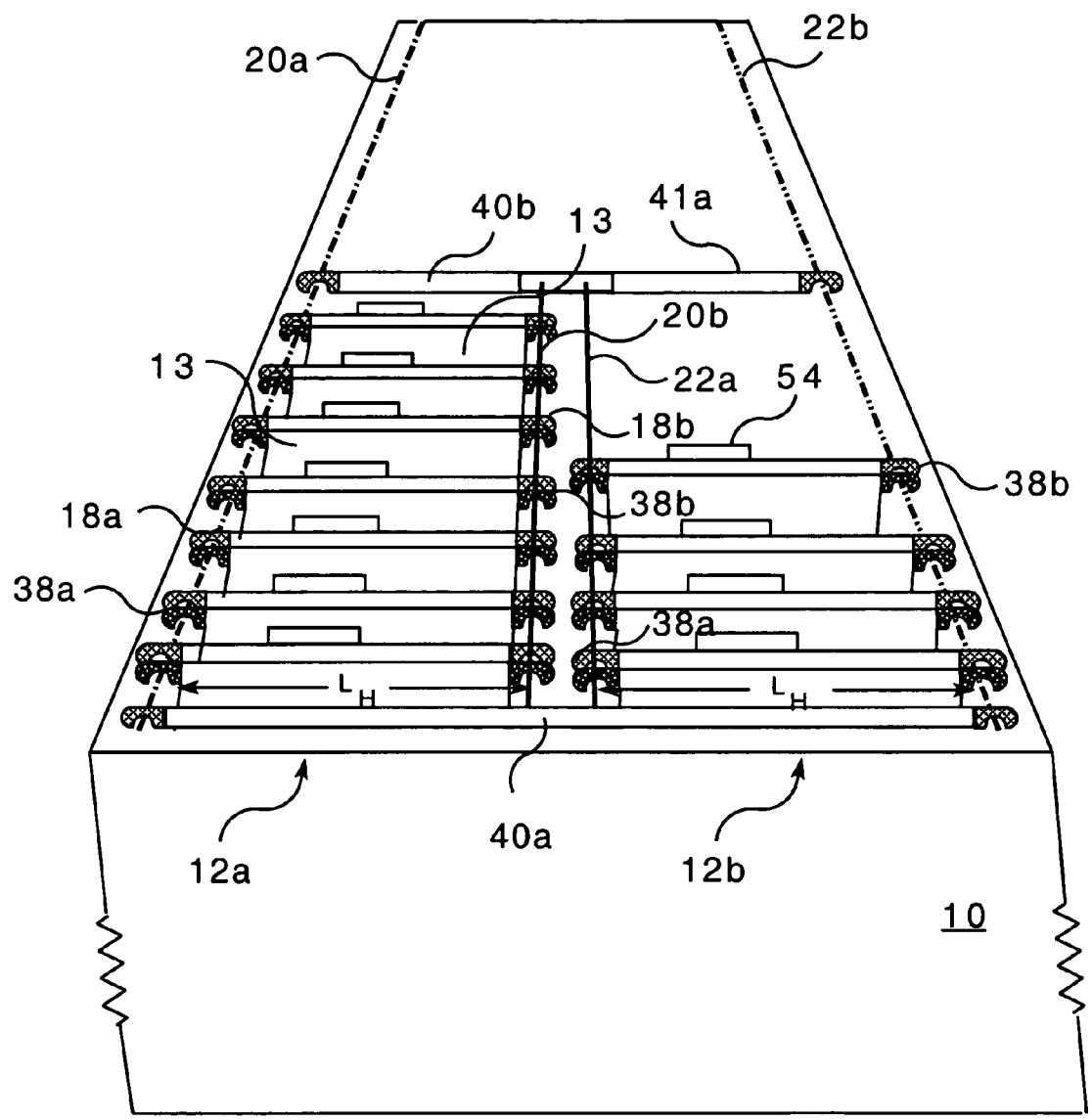
FIG. 1b is a three dimensional view of a standard letter sized file drawer with another embodiment of an adapter of the present invention.
Figure 2A:
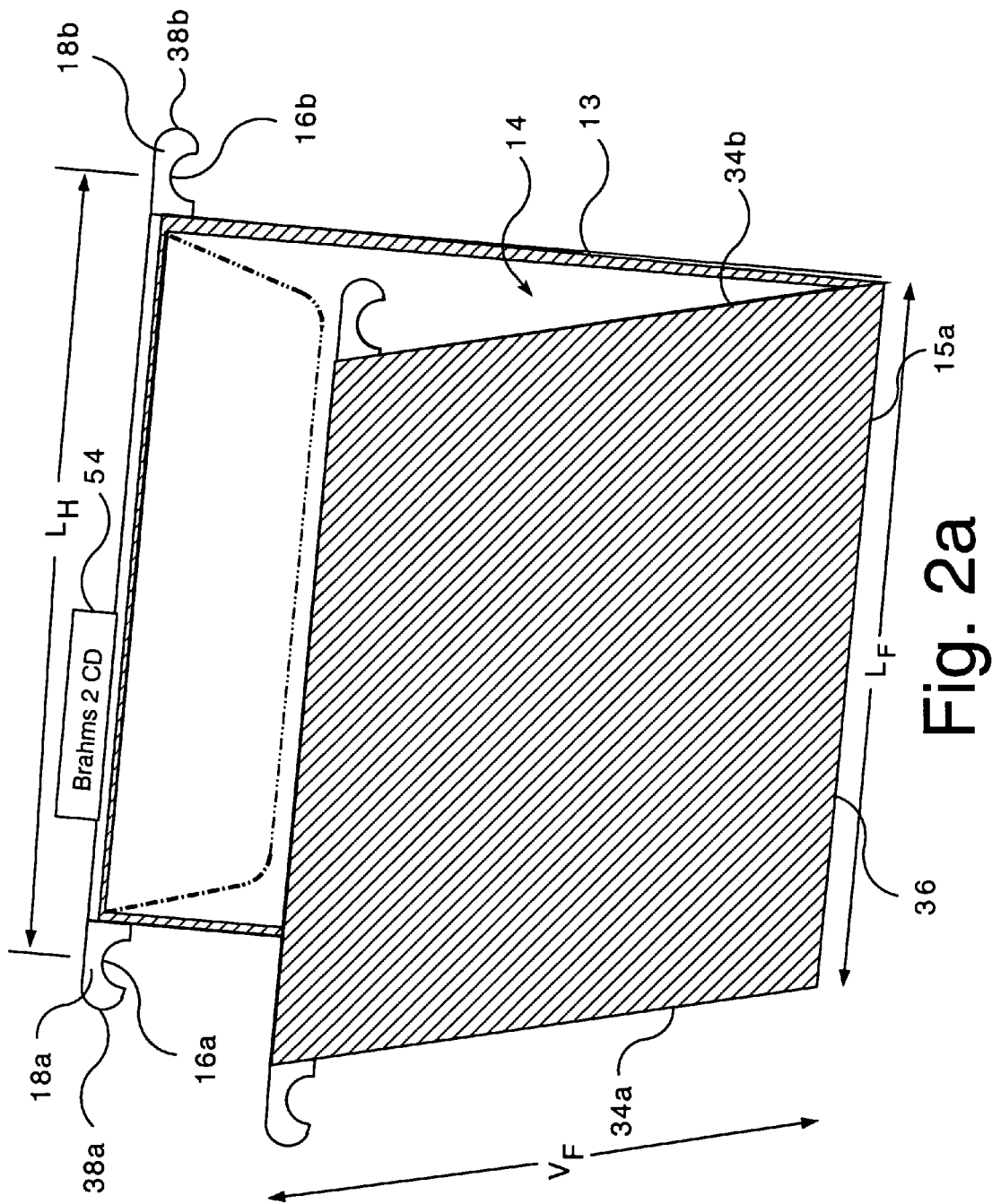
FIG. 2a is a three dimensional view of a hanging file folder of the present invention containing an envelope and a CD.

Standard letter size file drawer 10 includes two rows 12a, 12b of hanging file folders 13, as shown in FIGS. 1a, 1b. Each hanging file folder 13 is fabricated of folded heavy paper, and has open sides 14, as shown in FIG. 2a, similar to standard low cost letter and legal sized hanging file folders but smaller in at least one dimension. Hanging file folder 13 can have either a V shaped bottom 15a or it can have a flat bottom 15b (FIG. 5b) to accommodate a larger number of CDs or other small planar objects.

Figure 2B:
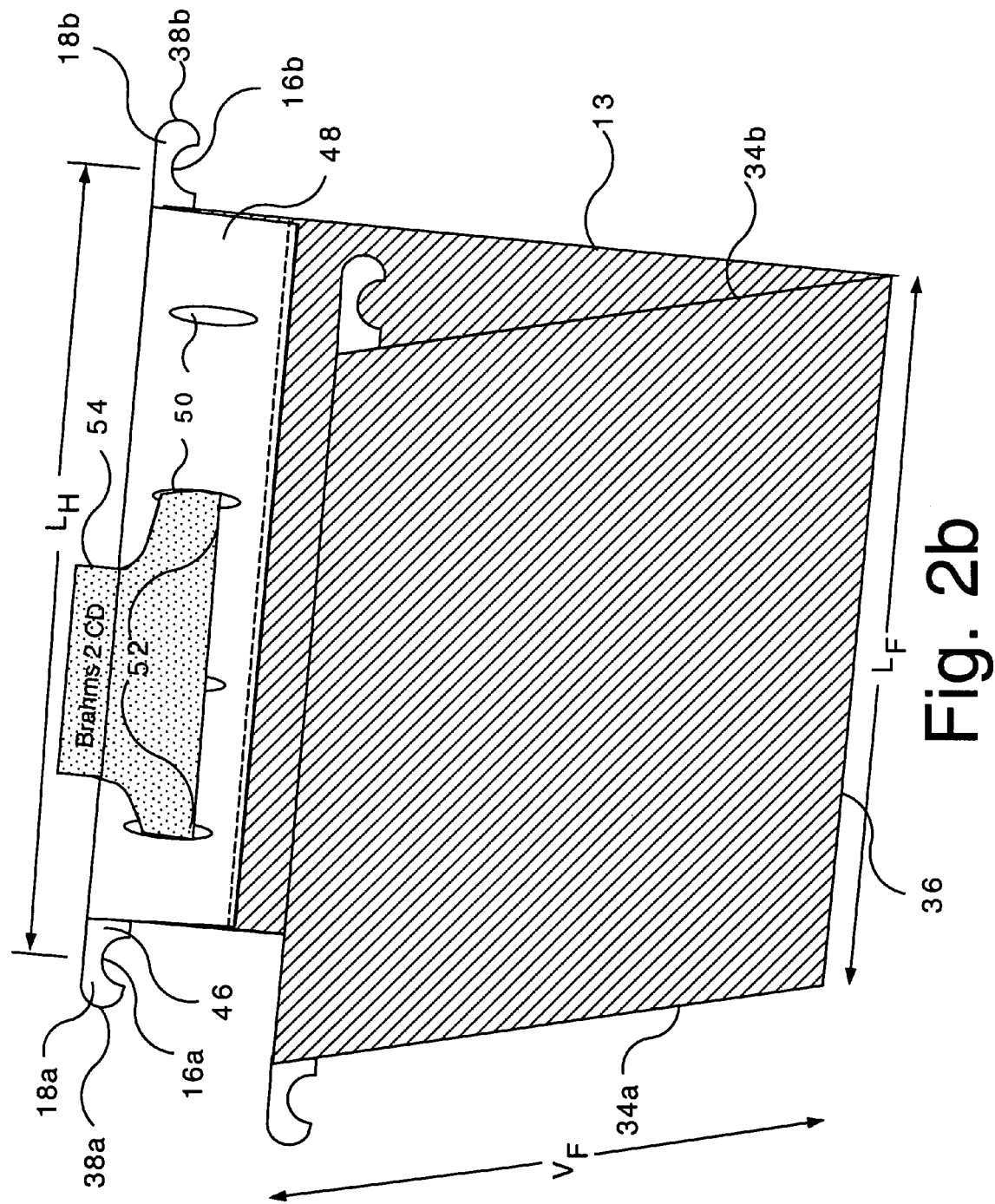
FIG. 2b is a three dimensional view of the hanging file folder of FIG. 2a with the envelope removed to show the system for providing a label.
Figure 3:
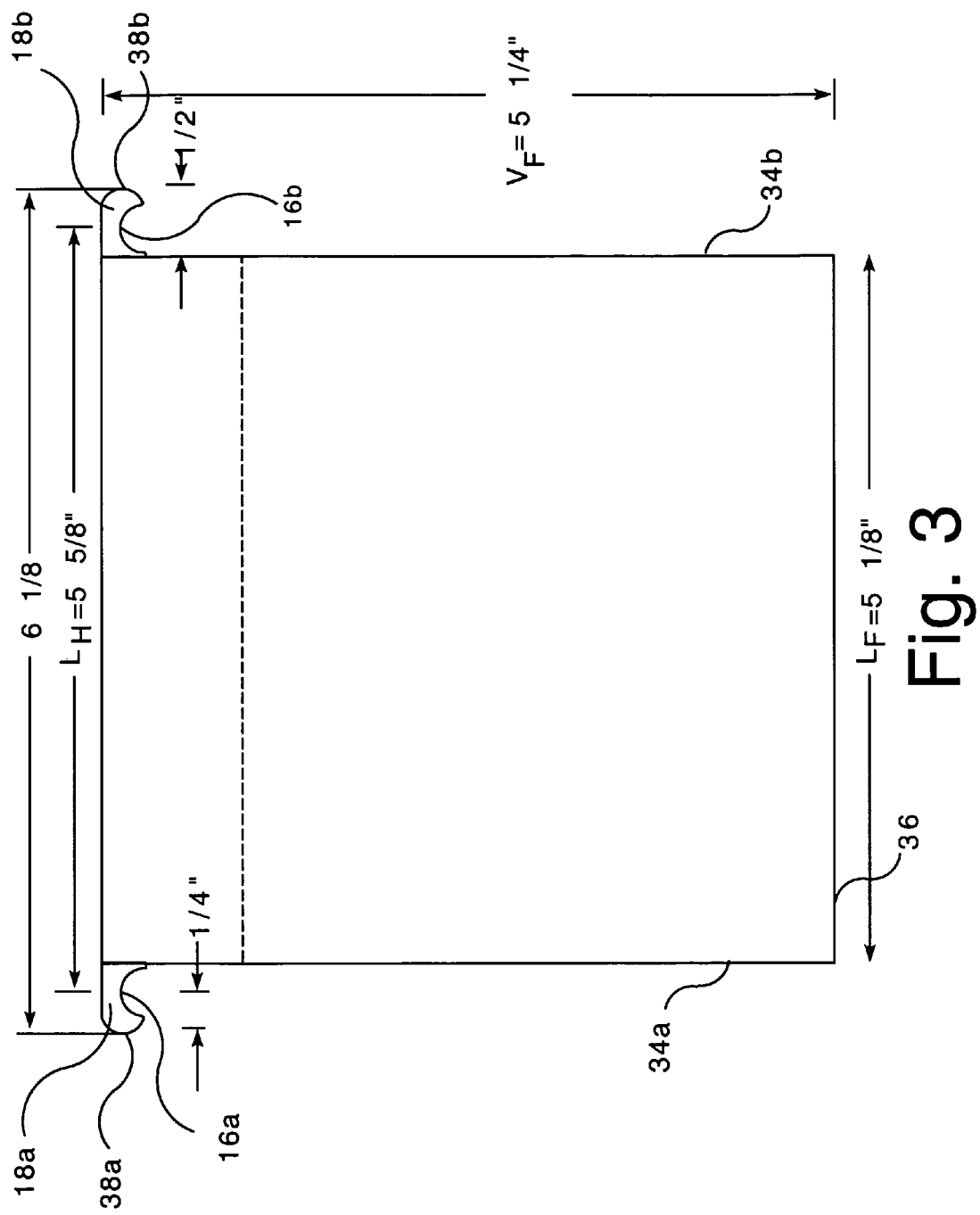
FIG. 3 is a front view of the hanging file folder shown in FIG. 2a showing one example of dimensions for the folder.
Figure 4A:
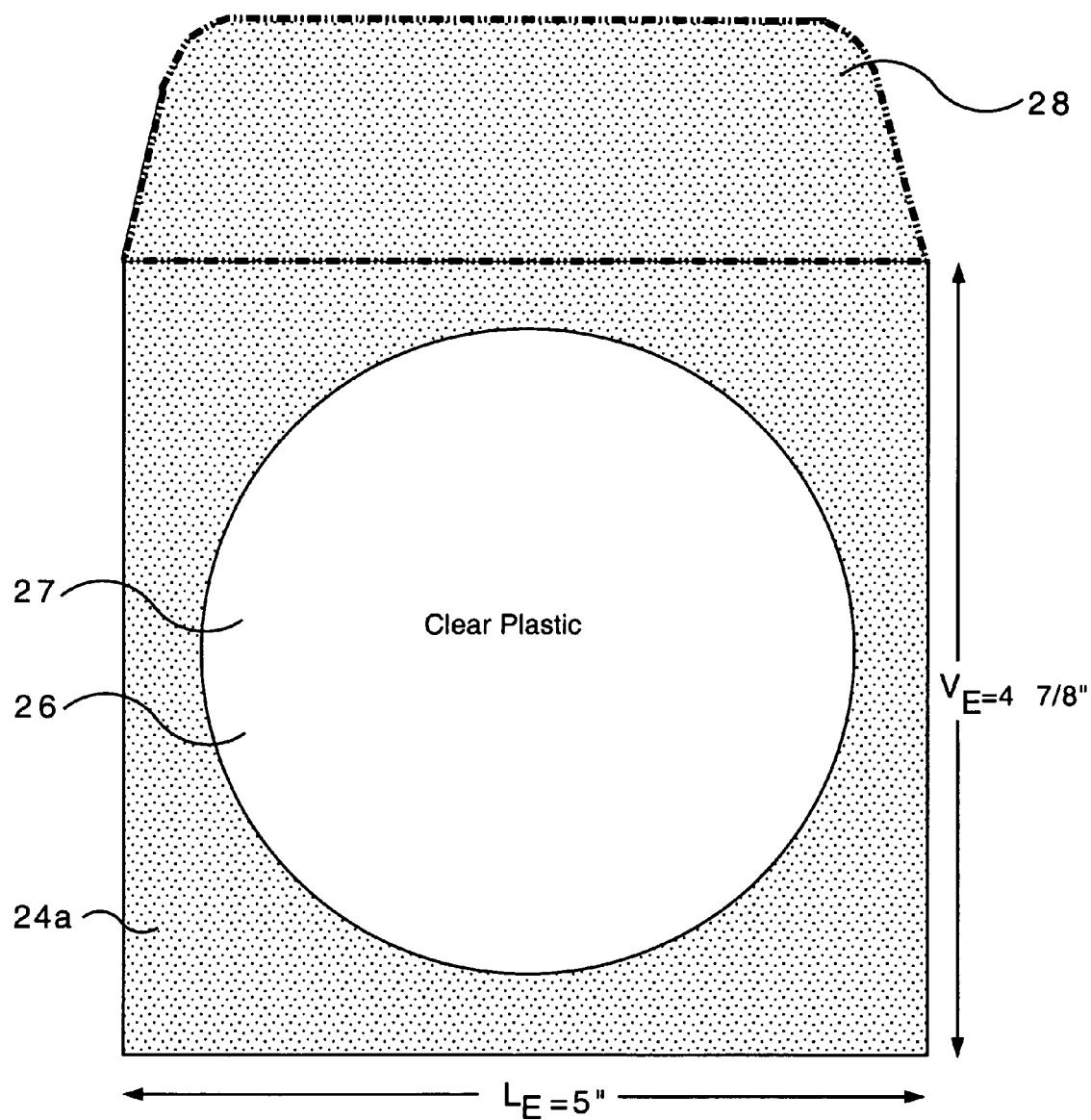
FIGS. 4a–4b are front views of prior art protective envelopes for use with the hanging a file folder of the present invention.
Figure 4B:
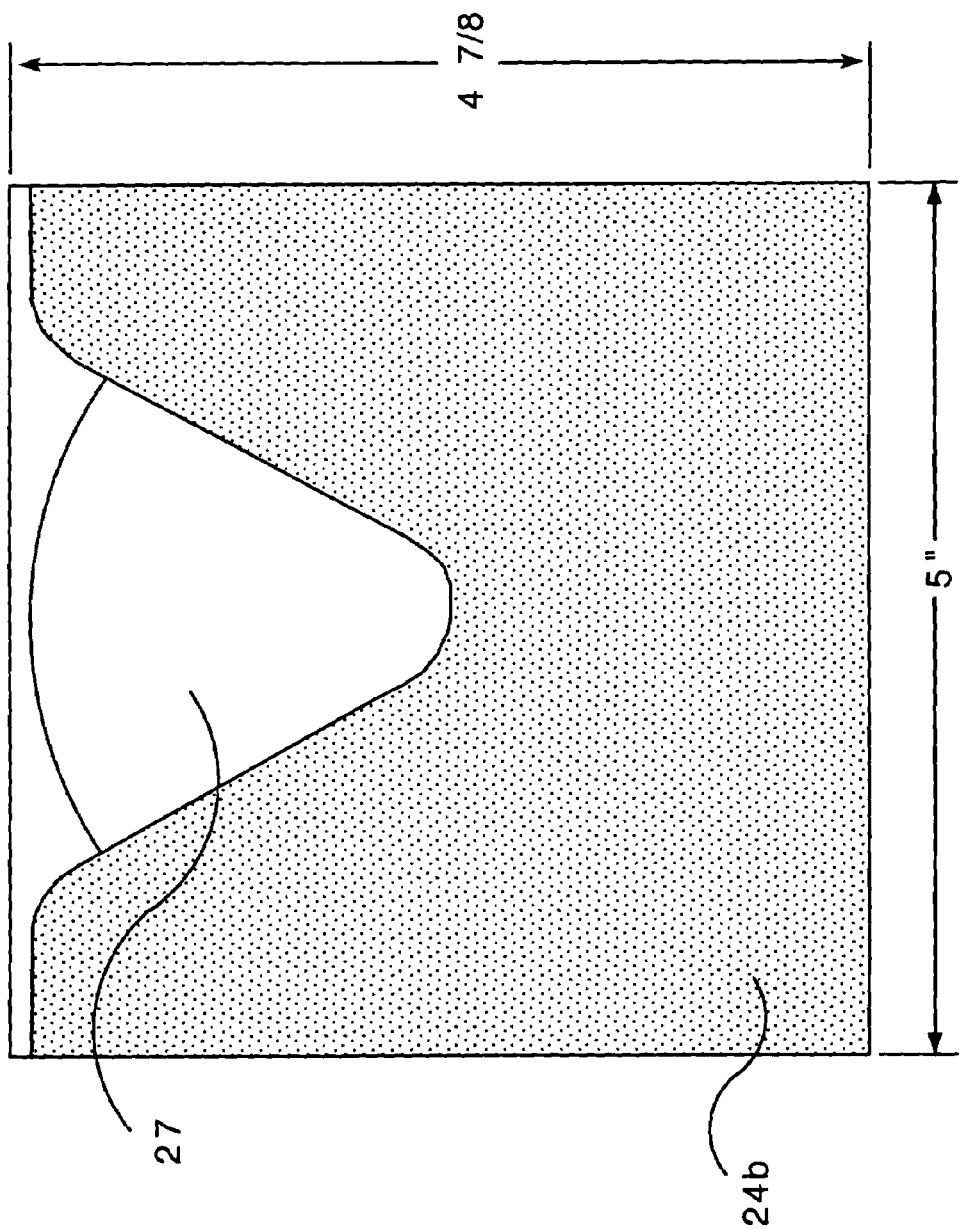

Each hanging file folder 13 has a hanger spacing $L_H$, as shown in FIGS. 1, 2a, 2b, and 3. $L_H$ is the distance between midpoints 16a, 16b of hangers 18a, 18b. $L_H$ is about 5⅝ inches to accommodate compact disks or video disks, as shown in FIG. 3. Hangers 18a, 18b hang from pair of rails 20a, 20b and from pair of rails 22a, 22b in file drawer 10. Rails 20a, 20b and rails 22a, 22b are spaced from each other by this same 5⅝ inch distance to accommodate these hanging file folders 13. Standard compact disks, which typically have a diameter of about 4¾ inches, are stored in envelope 24a, 24b that has an envelope length $L_E$ of about 5 inches, as shown in FIGS. 4a 4b. In this case hanger spacing length $L_H$ is preferably in the range from about 5⅜ inches to about 5¾ inches, and more preferably 5⅝ inches, so that two rows of hanging file folders 13 can fit in standard letter sized file drawer 10.

Preferably envelope 24a, 24b is provided for holding each individual CD, DVD, floppy disk, photographic film or prints, or other small planar object within folder 13, thereby allowing storage of multiple such small planar objects in each hanging file folder 13 while avoiding the possibility of one small planar object scratching another. Envelope 24a, 24b also permits handling without risk of placing fingerprints on the CD or other small planar object. Envelope 24a, 24b is sized to hold the CD, DVD, floppy disk or other small planar object. For a CD, envelope 24a, 24b is approximately square and with a dimension of about 5 inches on a side.

Envelope 24a, 24b may be fabricated of paper or it may be fabricated of a transparent material, such as plastic. It can also be fabricated of a non-woven fabric. Alternatively a paper envelope may have transparent plastic portion 26, allowing CD 27 or a label on CD 27 to be viewed without opening the envelope, as shown in FIG. 4a, which illustrates window type CD envelope 24a that is well known in the art. Envelope 24a may have flap 28, as shown in FIG. 4a or flap 28 may be omitted, as shown for envelope 24b in FIG. 4b which provides another prior art way to see CD 27 within.

In some cases an envelope may not be needed, for example, where only a single small planar object is stored in each folder 13 or for storing recipes or receipts for which there is no concern about scratching.

Figure 5A:
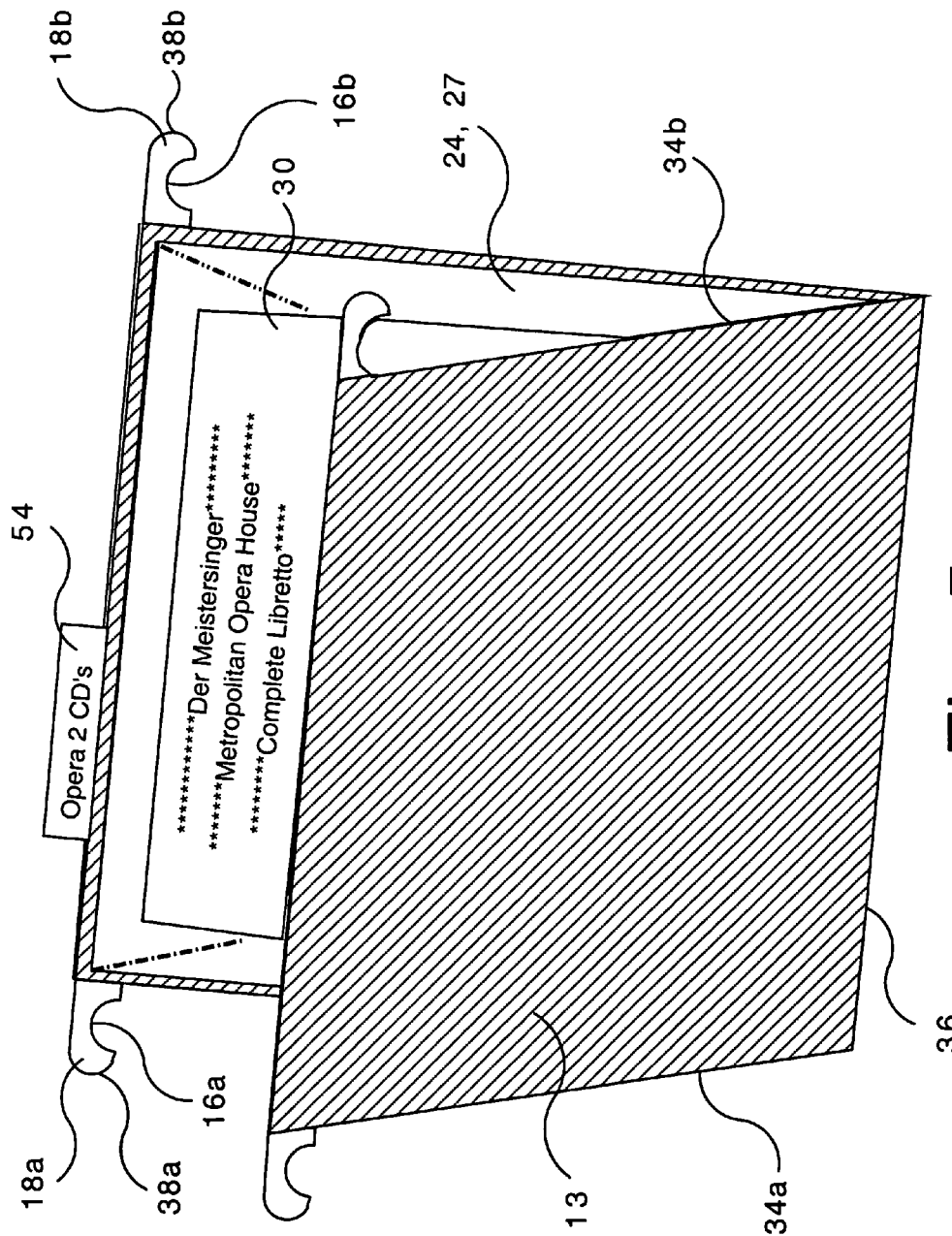
FIG. 5a is a three dimensional view of a hanging file folder of the present invention that contains a printed insert piece and an envelope containing a CD.

Printed insert piece 30 may be included in hanging file folder 13, along with CD 27 enclosed in envelope 24a, 24b to provide identifying information or other information about CD 27, as shown in FIGS. 5a, 5b.

Midpoints 16a, 16b of hangers 18a, 18b typically extend about ¼ inch beyond side edges 34a, 34b of folder 13, as shown in FIG. 3. Thus, bottom edge 36 of folder 13 has length $L_F$ that is about ½ inch less than hanger spacing $L_H$. For dimensions given above, this means that bottom edge 36 has a length $L_F$ that is about 5⅛ inches long, about ⅛ inch longer than envelope length $L_E$. Bottom edge 36 preferably has a length that is about equal to or greater than length $L_E$ of envelope 24.

Hangers 18a, 18b each extend to hanger ends 38a, 38b about ¼ inch beyond their midpoints 16a, 16b, making the total spacing from rail 20 to end 38b of hanger 18b about equal to 5⅞ inches. Two such rows 12a, 12b thus take up about 11¾ inches of the space between rails of standard file drawer 10. Spacing between rails of a standard letter sized file drawer is about 12⅛ inches. Thus, there is about ⅜ inch clearance between ends 38b of hangers 18b of hanging file folders in row 12a and ends 38a of hangers 18a of hanging file folders in row 12b in the two row system shown in FIGS. 1a, 1b. Greater clearance is available by providing the double row adapters in a legal size drawer or by shrinking some of the dimensions.

Figure 6A:
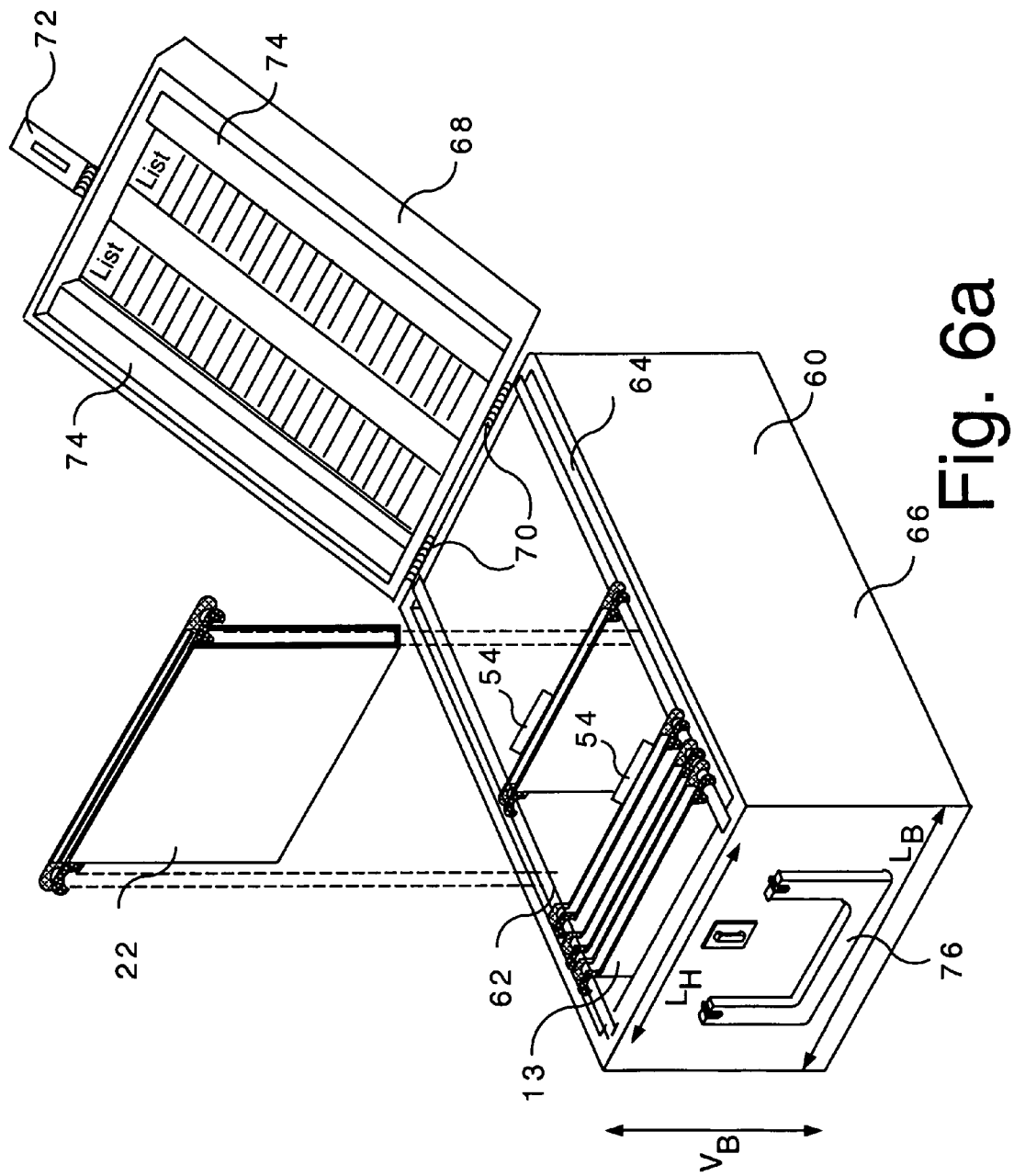
FIG. 6a is a three dimensional view of portable container of the present invention for storing a row of hanging file folders of the present invention.
Figure 6B:
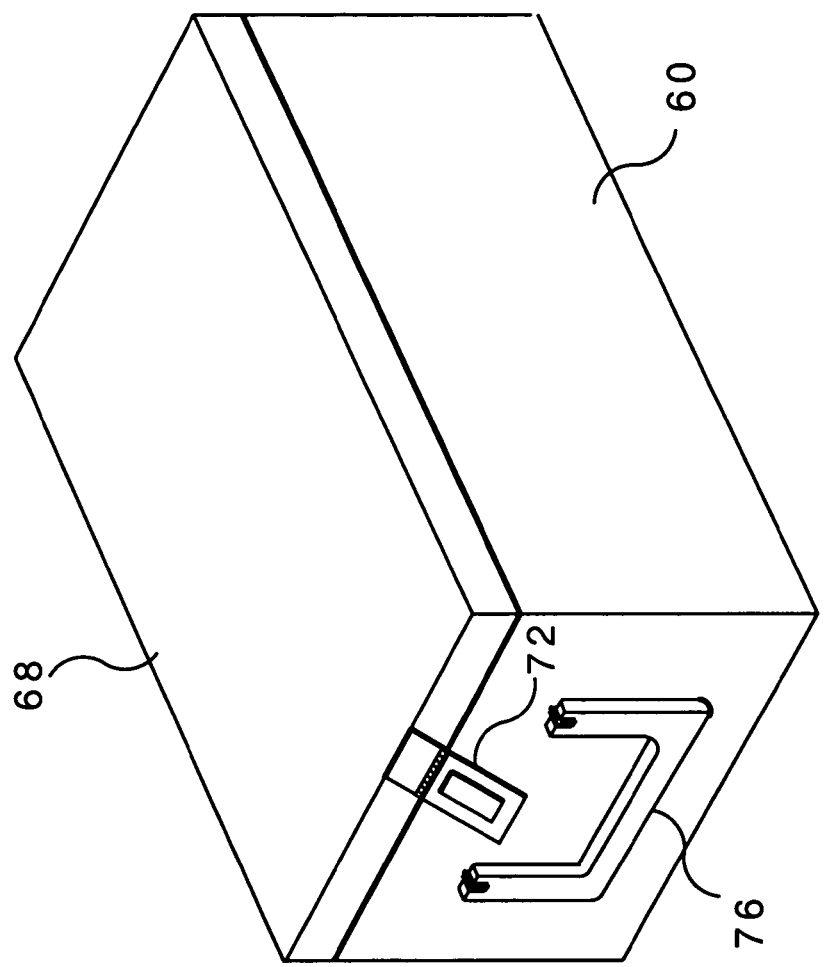
FIG. 6b is a three dimensional view of portable container of FIG. 6a with the lid closed.

Of course, all of these dimensions can be changed. For smaller sized CDs or for smaller planar objects, hanging file folders 13 can be fabricated with hanger length $L_H$ that is smaller than the approximately 5⅝ inches described herein above. For small planar objects having a sufficiently small length so that $L_H$ is reduced below about 3¾ inches, 3 or more rows of hangers can be provided in a standard letter or legal size file drawer. Alternatively these smaller hanging file folders can be stored in specially fabricated box 60, as shown in FIGS. 6a–6c, that is sized to match the dimensions of folders 13.

For planar objects having a diameter or length larger than that of standard CDs but smaller than spacing available in letter sized hanging file drawer 10, hanging file folders with correspondingly larger $L_H$ can be fabricated. In this case only one row of hanging file folders 13 may fit across standard letter size file drawer 10. Hanging file folders with an $L_H$ sized to match the diameter or length of the small planar object can be used with an adapter in standard letter or legal sized drawer 10, as described herein above. Alternatively, these hanging file folders can be stored in specially fabricated box 60 that is sized to match the dimensions of folders 13, as shown in FIGS. 6a–6c.

With envelope 24a, 24b having a vertical dimension $V_E$ of about 4⅞ inches, hanging file folder 13 would preferably have vertical dimension $V_F$ that is about ⅜ inch more or about 5¼ inches. This dimension can range from the diameter of a CD of about 4⅝ to about 9 inches.

For accommodating other small planar objects, other length and vertical dimension for file folder 13 can be chosen that are slightly larger than the dimensions of the object being stored. Such hanging file folders can be sized to accommodate other small planar objects such as floppy disks, checks, receipts, credit cards, photographs, greeting cards, personal notes, deposit slips, memos, recipes, ticket stubs, and cards, such as baseball cards, time cards, and golf score cards. For envelopes holding 5×7 photographs for example, this vertical dimension of hanging file folder 13 might be around 7½ inches. For floppy disks having a vertical dimension of 3⅝ inches, vertical dimension of hanging file folder 13 would be about 4 inches. Thus, $L_H$ can be as small as about 1½ inches, and $L_H$ can range up in size corresponding to the length dimension of the small planar objects being stored. Similarly, length $L_F$ can be as small as about 1 inch and $L_F$ can also range up in size corresponding to the vertical dimension of the small planar objects. In the present invention, hanging file folders having length and vertical dimensions are provided to match the dimension of a product that is produced in sufficiently high volumes.

Rails 20a and 22b in FIGS. 1a, 1b may be the standard rails that are integral with standard letter sized drawer 10. Alternatively, rails 20a and 22b may be standard rails that are part of a standard adapter that is routinely used to fit into those letter or legal sized file drawers that do not have integral rails. Rails 20b and 22a are additional rails provided to accomplish the present invention within a standard letter or legal sized file drawer. In one embodiment, rails 20b and 22a may be supported by end rails (not shown) that may be integral with some standard letter sized file drawers.

Alternatively, rails 20b and 22a may be supported by end portions of a standard adapter used for letter or legal sized file drawers 10 (not shown) using clamps, as shown in FIG. 1a.

Figure 7C:
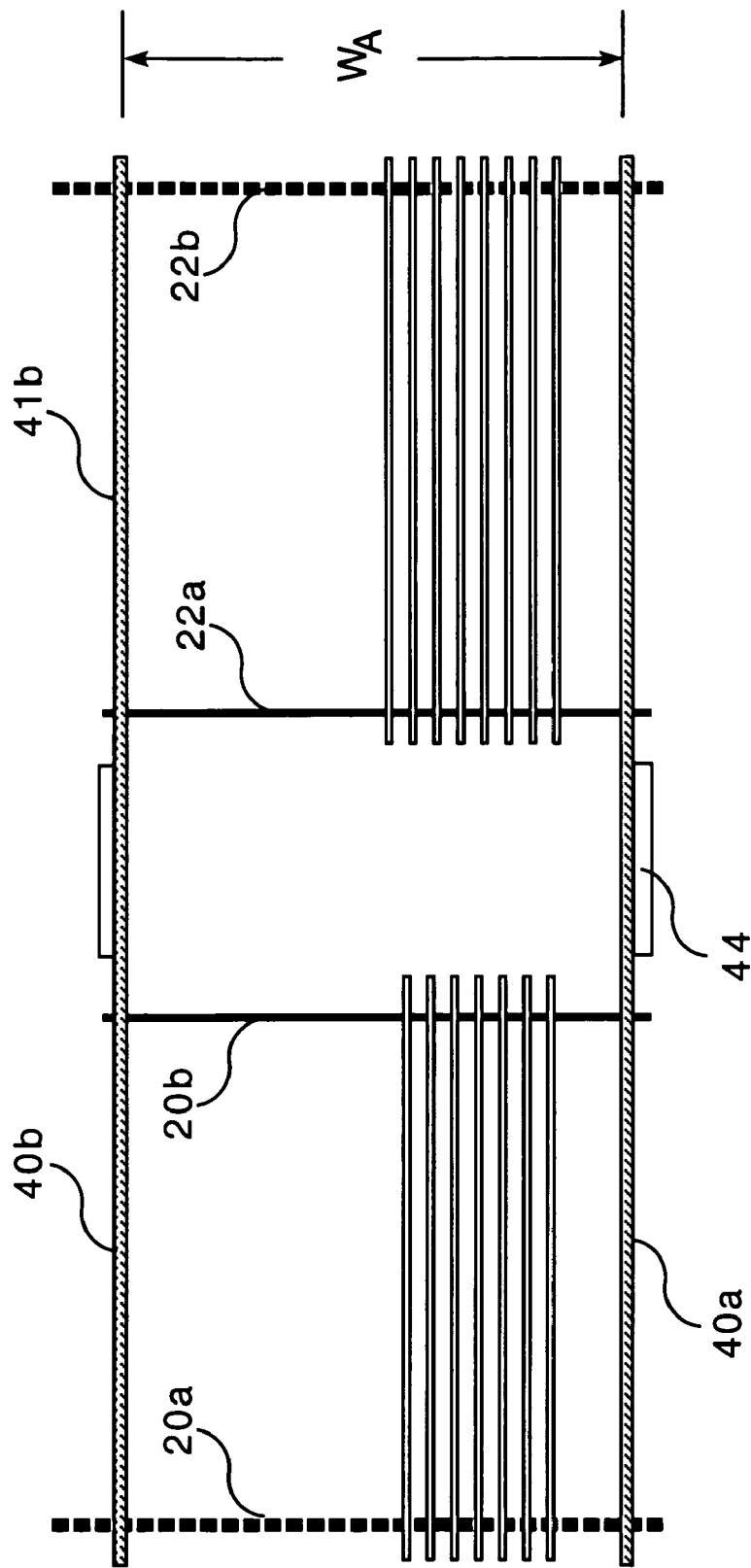
FIG. 7c is a top view of an adapter for converting part of a standard legal sized file drawer into one for accommodating two rows of hanging file folders of the present invention.

For drawers having integral rails 20a, 22a (but not having integral end rails), two end support hangers 40a, 40b, may be provided, as shown in FIGS. 1b, 7a, and 7b, to form adapter 41a for letter sized drawers. A similar adapter 41b for legal size drawers is shown in FIG. 7c. Each end support hanger 40a, 40b extends from integral rail 20a to integral rail 22b. Additional rails 20b and 22a are supported by these added end support hangers 40a, 40b, as shown in FIG. 1a and FIGS. 7b, 7c. In one embodiment additional rails 20b and 22a extend through holes 42 in end support hangers 40a, 40b and are secured in end piece 44. Alternatively, rails 20b and 22a can be welded to end support hanger 40a, 40b.

Adapters 41a, 41b have a width $W_A$ to fill a portion of drawer 10, as shown in FIG. 1b, and FIGS. 7a, 7c, leaving room for letter sized folders to be stored in the same drawer if desired. Alternatively, width $W_A$ can be extended to fully fill drawer 10, as shown in FIG. 1a for adapter 41c formed with clamps.

Special end support hangers 40a, 40b are sized similar to hangers used to support standard letter sized hanging files that fit between rails 20a and 22b in a standard letter sized file drawer 10. However, special end support hangers 40a, 40b may be fabricated of a thicker material than used for hangers for letter or legal sized hanging folders since they will be bearing the weight of a large number of hanging file folders 13.

Hangers 18a, 18b may be formed with a single metal or plastic bar 46 extending through fold 48 in hanging file folders 13, as shown in FIG. 2b. Slots 50 can be provided in fold 48 to securely hold plastic tabs 52 that can hold identifying labels 54.

Adapter 41d for a letter sized drawer to provide for storing different sized small planar objects in each of two different length rows 43a, 43b is shown in FIG. 7d.

Substantial advantage is provided by shrinking dimensions of hanging file folders 13 from standard letter size to more nearly fit small planar objects. As described herein above, with CD hanging file folders 13 of the present invention being significantly smaller than ordinary prior art hanging file folders, standard file drawer 10 could hold two rows of such hanging file folders 13, using available space more efficiently and allowing finer cataloguing of CDs.

Specialized portable filing box 60 can be provided, as shown in FIGS. 6a–6c, sized for holding shrunken hanging file folders 13 of the present invention. Box 60 includes rail 62 and rail 64 spaced a distance $L_H$ from each other to accommodate spacing $L_H$ between midpoints 16a, 16b of hangers 18a, 18b of hanging file folder 13. Box 60 has a box length $L_B$ sufficiently larger than length $L_H$ of hanging file folders 13 to provide spacing for extending portions of hangers 18a, 18b of hanging file folders 13 and the thickness of side walls 66 of box 60. Box 60 has a vertical dimension $V_B$ sufficiently larger than vertical dimension $V_F$ of hanging file folders 13 to provide at least a small spacing under hanging file folders 13 and to take into account the thickness of the bottom surface (not shown) of box 60.

Portable filing box 60 preferably includes cover 68 having hinge 70 and latch 72 for retaining files in box 60 during transport. Cover 68 can include retaining bars 74 for holding hanging file folders 13 in place, as shown in FIGS. 6a, 6b. Retaining bars 74 may be fabricated of a pliable material, such as foam rubber to firmly hold hanging file folders 13 and their contents in place during transport. Preferably retaining bars 74 are located to avoid pressing on labels 54.

Alternatively, filing box 80 can be provided that needs no cover. File folders 13 and their contents can be secured in filing box 80 by providing elastic hold-downs 82, as shown in FIG. 6c. Elastic hold-downs 82 are secured to filing box 80 around button-shaped pins 84 that are connected to four edges of filing box 80, as shown in FIGS. 6c–6e.

Box 60, 80 may be fabricated of a material such as clear or opaque plastic, wood, metal, cardboard, or corrugated. Heavy paper, leather, or cloth could also be used with an internal frame. Preferably box 60 has rounded corners and handle 76 for easy carrying, as shown in FIG. 6a.

While several embodiments of the invention, together with modifications thereof, have been described in detail herein and illustrated in the accompanying drawings, it will be evident that various further modifications are possible without departing from the scope of the invention. For example, hanging file folders 13 can be fabricated of plastic or can have various colors. Nothing in the above specification is intended to limit the invention more narrowly than the appended claims. The examples given are intended only to be illustrative rather than exclusive.

What is claimed is:

1. A filing system for holding a planar object having a planar object dimension, comprising:
    a hanging file folder wherein said hanging file folder has open sides and two permanently fixed hangers, wherein said hangers each have midpoints, wherein said midpoints are separated by a fixed hanger separation length wherein said hanger separation length is less than half a standard letter sized hanger separation length wherein said hanging file folder has a hanging file folder length that is slightly smaller than said fixed hanger separation length; and
    a removable protective envelope having a removable protective envelope length, wherein said hanging file folder is sized for holding said removable protective envelope, wherein said hanging file folder length about matches said removable protective envelope length, wherein said removable protective envelope is sized for holding the planar object, and wherein said removable protective envelope length about matches the planar object dimension.

2. A filing system as recited in claim 1, wherein said hanger separation length is in the range of 1½ inches to 7 inches.

3. A filing system as recited in claim 1, wherein said hanger separation length is in the range from 5¼ inches to 5¾ inches.

4. A filing system as recited in claim 1, wherein said hanging file folder has a vertical dimension less than 8 inches.

5. A filing system as recited in claim 4, wherein said vertical dimension is in the range from 4⅞ inches to 5½ inches.

6. A filing system as recited in claim 5, wherein said vertical dimension is in the range from 5 inches to 5⅜ inches.

7. A filing system as recited in claim 1, further comprising said planar object, wherein said protective envelope holds said planar object within said hanging file folder.

8. A filing system as recited in claim 7, wherein said protective envelope is approximately square.

9. A filing system as recited in claim 7, wherein said protective envelope has an envelope length of about 5 inches and an envelope width of about 4⅞ inches.

10. A filing system as recited in claim 7, wherein said protective envelope has an envelope length, wherein said hanger separation length is longer than said envelope length by an amount in the range from ⅛ inch to 2 inches.

11. A filing system as recited in claim 7, wherein said hanging file folder is for holding a plurality of said planar objects, each in its own said protective envelope.

12. A filing system as recited in claim 7, wherein said protective envelope is for holding only one said planar object.

13. A filing system as recited in claim 7, wherein said protective envelope includes a transparent portion.

14. A filing system as recited in claim 7, wherein said planar object includes a memory storage device.

15. A filing system as recited in claim 14, wherein said memory storage device comprises at least one from the group including an optical disk, a disk, a digital video disk, and a magnetic storage disk.

16. A filing system as recited in claim 14 wherein said hanging file folder further comprises a printed insert piece with information corresponding to said memory storage device.

17. A filing system as recited in claim 1, wherein said hanging file folder further comprises an identifying tab and label.

18. A filing system as recited in claim 1, further comprising a box for holding a plurality of said hanging file folders.

19. A filing system as recited in claim 18, wherein said box includes a pair of parallel rails for supporting said hangers.

20. A filing system as recited in claim 19, wherein said box has a dimension sufficient for supporting letter or legal sized hanging file folders, wherein said box includes at least four parallel rails for supporting at least two of said hanging file folders in space of a single standard letter or legal sized folder, wherein each said hanging file folder is separately removable.

21. A filing system as recited in claim 20, wherein said box includes a retaining bar for locking said hanging file folders in place during transport.

22. A filing system as recited in claim 21, wherein said retaining bar includes a pliable material member.

23. A filing system as recited in claim 21, wherein said box includes a box cover, wherein said retaining bar is attached to said box cover.

24. A filing system as recited in claim 21, wherein said box includes an elastic member for holding said hanging file folders in place during transport.

25. A fling system as recited in claim 1, wherein the planar object is subject to damage from at least one from the group including scratches and fingerprints, wherein said removable protective envelope provides the planar object with protection from said damage.

26. A filing system as recited in claim 1, wherein said hanging file folder has a hanging file folder width, said removable protective envelope has a removable protective envelope width, and the planar object has a second planar object dimension, wherein said protective envelope width about matches said second planar object dimension, wherein said hanging folder width about matches said removable protective envelope width.

27. A filing system, comprising:
a hanging file folder wherein said hanging file folder has open sides and two permanently fixed hangers, wherein said hangers each have midpoints, wherein said midpoints are separated by a fixed hanger separation length wherein said hanger separation length is less than half a standard letter sized hanger separation length, wherein said hanging file folder has a hanging file folder length that is slightly smaller than said fixed hanger separation length and wherein said hanging file folder has a hanging file folder vertical dimension; and
a removable protective envelope having a removable protective envelope length and a removable protective envelope vertical dimension, wherein said hanging file folder is sized for holding said removable protective envelope, wherein said hanging file folder length about matches said removable protective envelope length and wherein said hanging file folder vertical dimension about matches said removable protective envelope vertical dimension;
a planar object having a planar object length and a planar object vertical dimension wherein said removable protective envelope is sized for holding said planar object, wherein said removable protective envelope length about matches said planar object length and wherein said removable protective envelope vertical dimension about matches said planar object vertical dimension.

28. A filing system as recited in claim 27, wherein said planar object is subject to damage from at least one from the group including scratches and fingerprints, wherein said removable protective envelope provides the planar object with protection from said damage.

29. A filing system as recited in claim 28, wherein said hanger separation length is in the range from 5¼ inches to 5¾ inches and said vertical dimension is in the range from 5 inches to about 5⅜ inches.

30. A filing system as recited in claim 29, wherein said protective envelope has an envelope length of about 5 inches and an envelope width of about 4⅞ inches.

31. A filing system as recited in claim 27, wherein said hanging file folder holds a plurality of protective envelopes and wherein said each said protective envelope holds at most one said planar object.

32. A filing system as recited in claim 27, wherein said protective envelope includes a transparent portion.

33. A filing system as recited in claim 27, further comprising a box for holding a plurality of said hanging file folders, wherein said box includes a pair of parallel rails for supporting said hangers.

34. A filing system as recited in claim 33, wherein said box has a dimension sufficient for supporting letter or legal sized hanging file folders, wherein said box includes at least four parallel rails for supporting at least two rows of said hanging file folders in space of a single row of standard letter or legal sized folders, wherein each said hanging file folder is separately removable.

35. A filing system as recited in claim 33, wherein said box includes a system for holding said hanging file folders in place during transport.

* * * * *